United States Patent [19]

Kobayashi et al.

[11] Patent Number: 5,538,483
[45] Date of Patent: Jul. 23, 1996

[54] FRICTION-ROLLER-TYPE CONTINUOUSLY VARIABLE TRANSMISSION

[75] Inventors: Katsuya Kobayashi, Yokosuka; Masaki Nakano, Yokohama, both of Japan

[73] Assignee: Nissan Motor Co., Ltd., Yokohama, Japan

[21] Appl. No.: 220,335

[22] Filed: Mar. 30, 1994

[30] Foreign Application Priority Data

Mar. 30, 1993 [JP] Japan ................................ 5-096810

[51] Int. Cl.$^6$ ................................................ F16H 15/38
[52] U.S. Cl. ........................................ 476/10; 476/42
[58] Field of Search ........................................ 476/10, 42

[56] References Cited

U.S. PATENT DOCUMENTS

| | | | |
|---|---|---|---|
| 4,905,529 | 3/1990 | Nakano | 476/10 |
| 5,083,473 | 1/1992 | Nakano | 476/10 |
| 5,136,890 | 8/1992 | Hibi et al. | 476/10 |
| 5,419,746 | 5/1995 | Nakano | 476/10 |

FOREIGN PATENT DOCUMENTS

| | | | |
|---|---|---|---|
| 4-29659 | 1/1992 | Japan . | |
| 2256684 | 12/1992 | United Kingdom | 476/10 |

Primary Examiner—Rodney H. Bonck
Assistant Examiner—Troy Grabow
Attorney, Agent, or Firm—Lowe, Price, LeBlanc & Becker

[57] ABSTRACT

A continuously variable transmission includes friction rollers which are arranged in a toroidal groove formed between input and output disks and rotatably supported by roller support members which are driven by a hydraulic cylinder device. A speed ratio control device includes a speed ratio control valve for controlling a hydraulic pressure to be supplied to the hydraulic cylinder device. A step motor has an angular position determined in accordance with a speed ratio as instructed by the speed ratio control device, and serves to drive the valve sleeve in a predetermined axial direction. A low switch serves to stop the valve sleeve, and effects a changeover between different positions of the switch when the valve sleeve has reached a position where the speed ratio becomes the lowest.

5 Claims, 12 Drawing Sheets

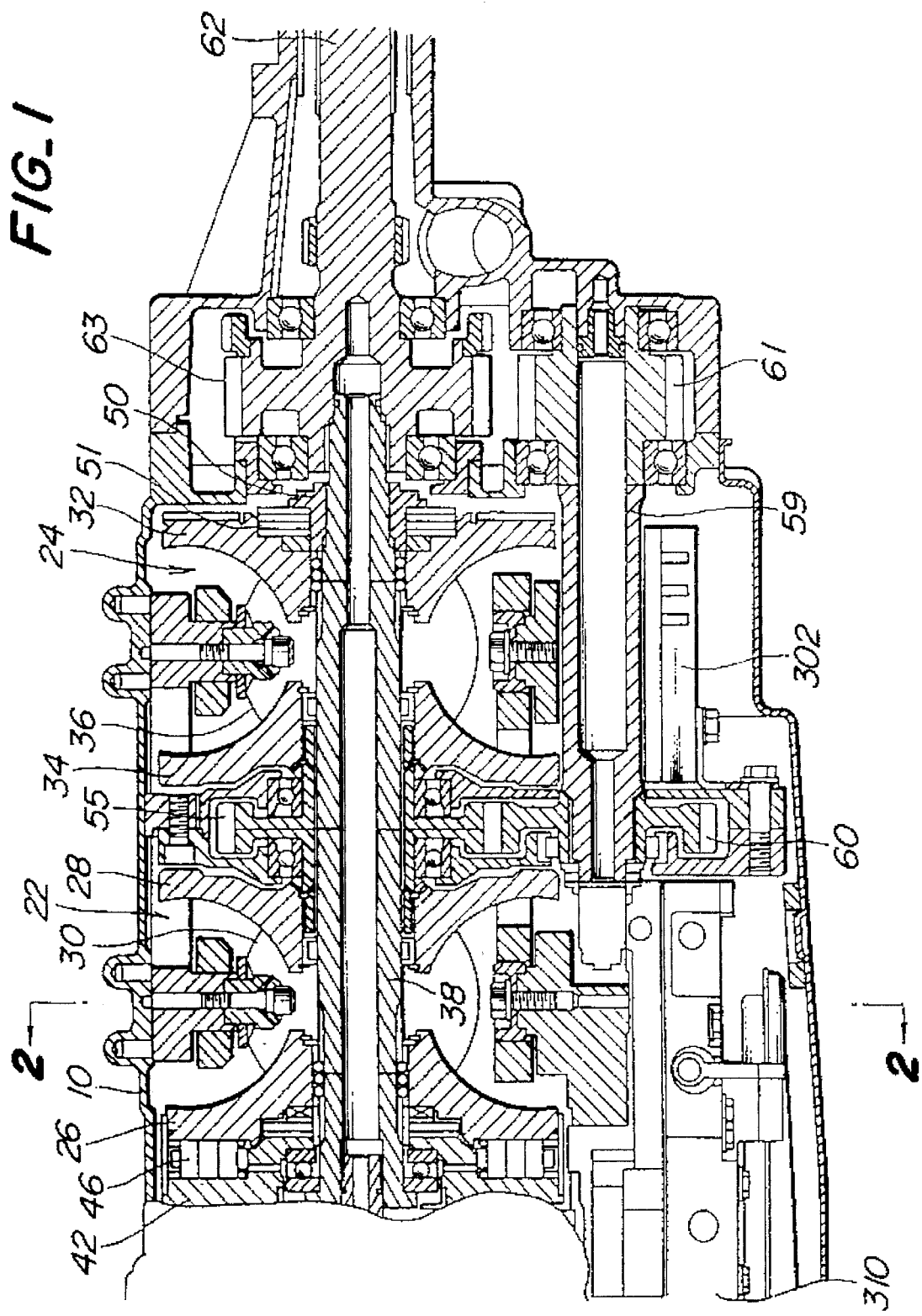

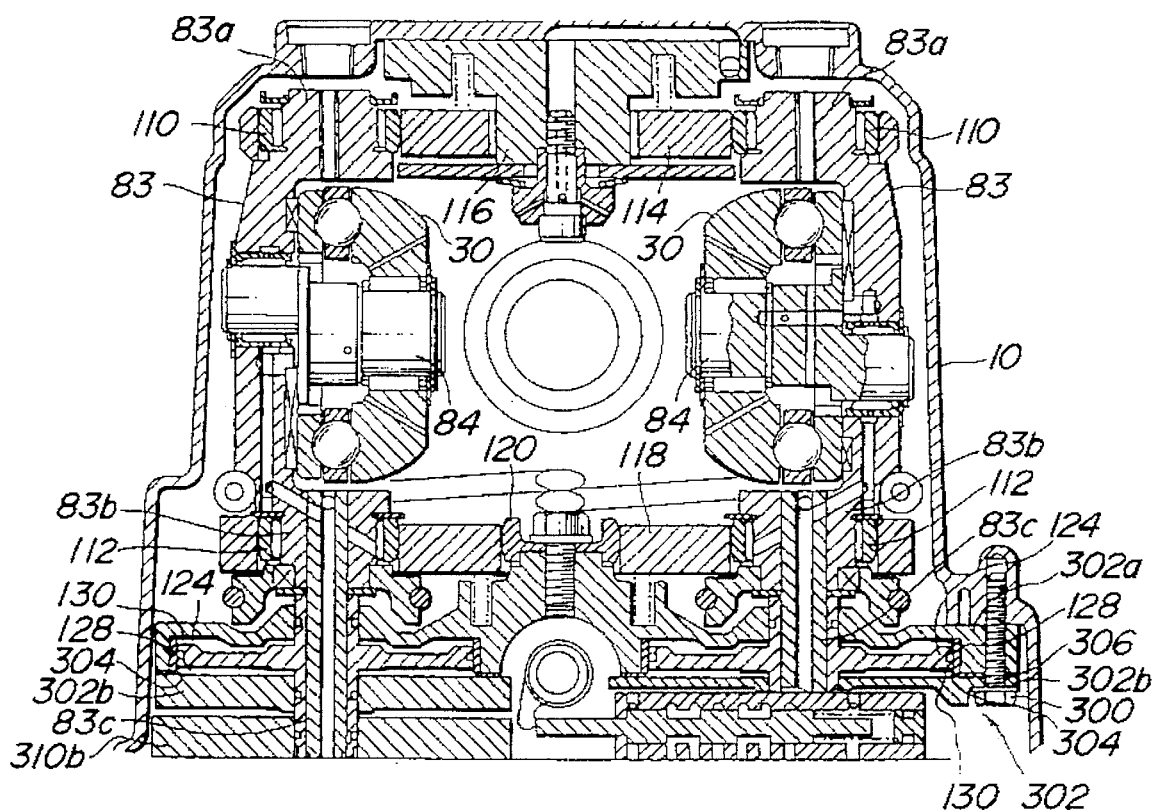
FIG_2

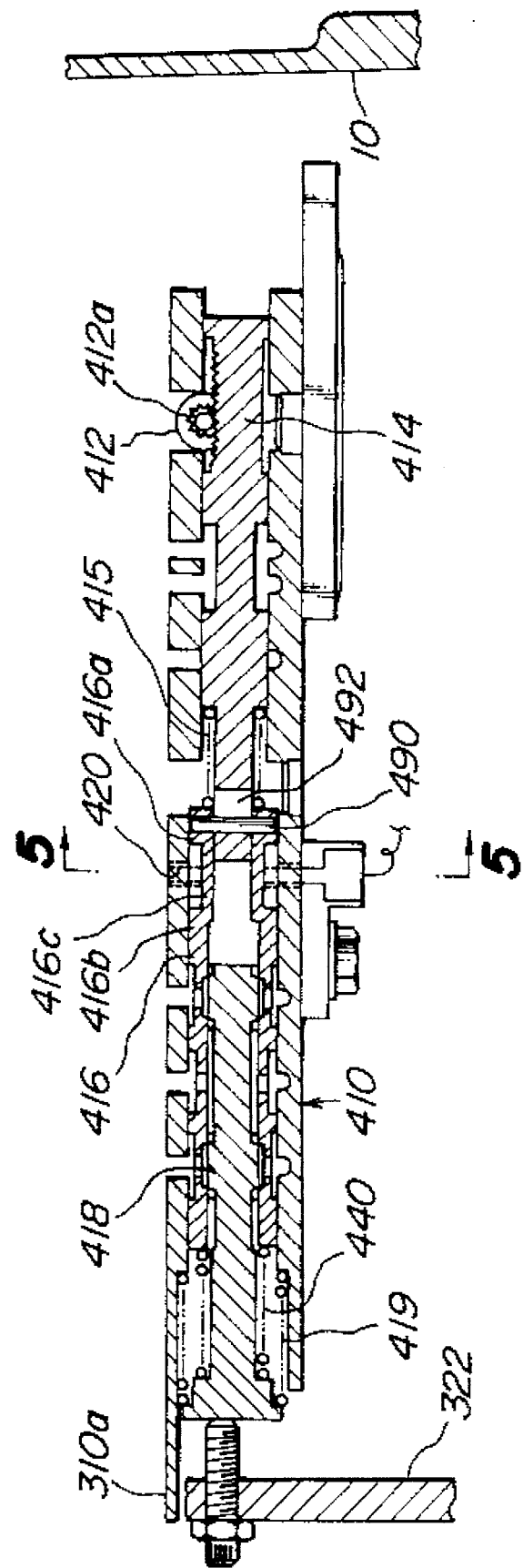

FIG_4
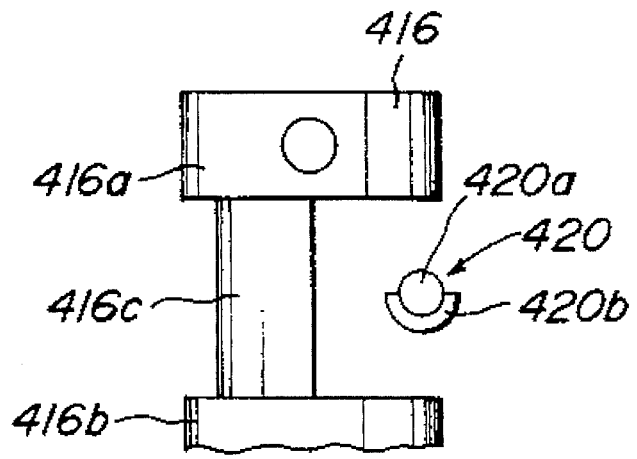
FIG_5
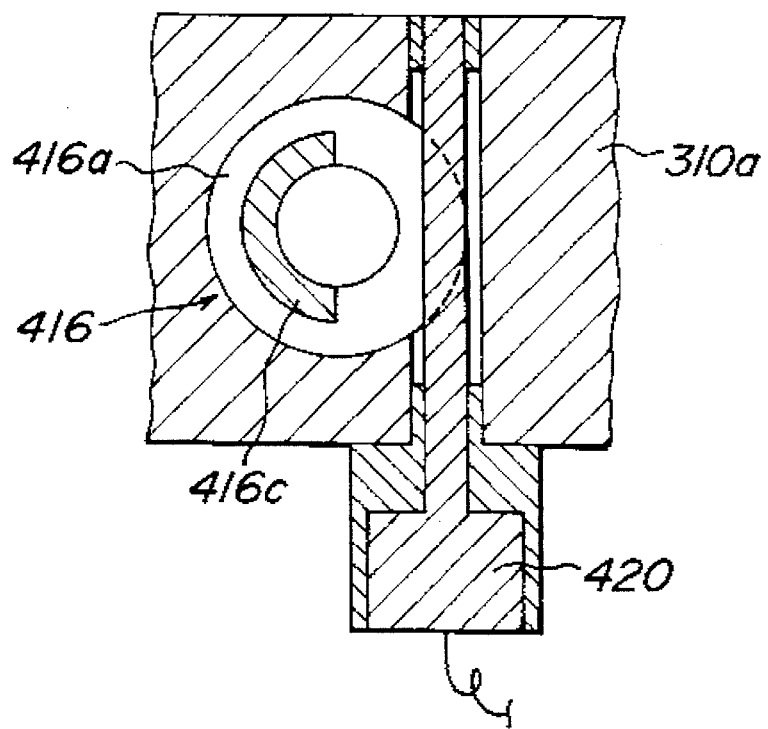

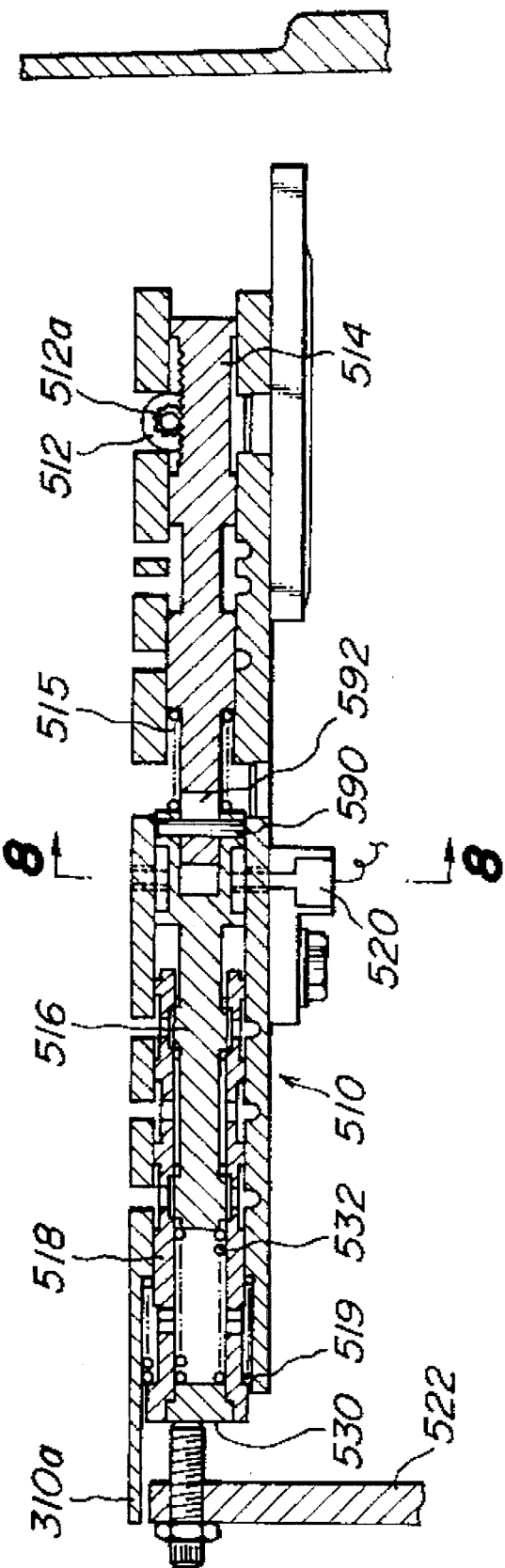

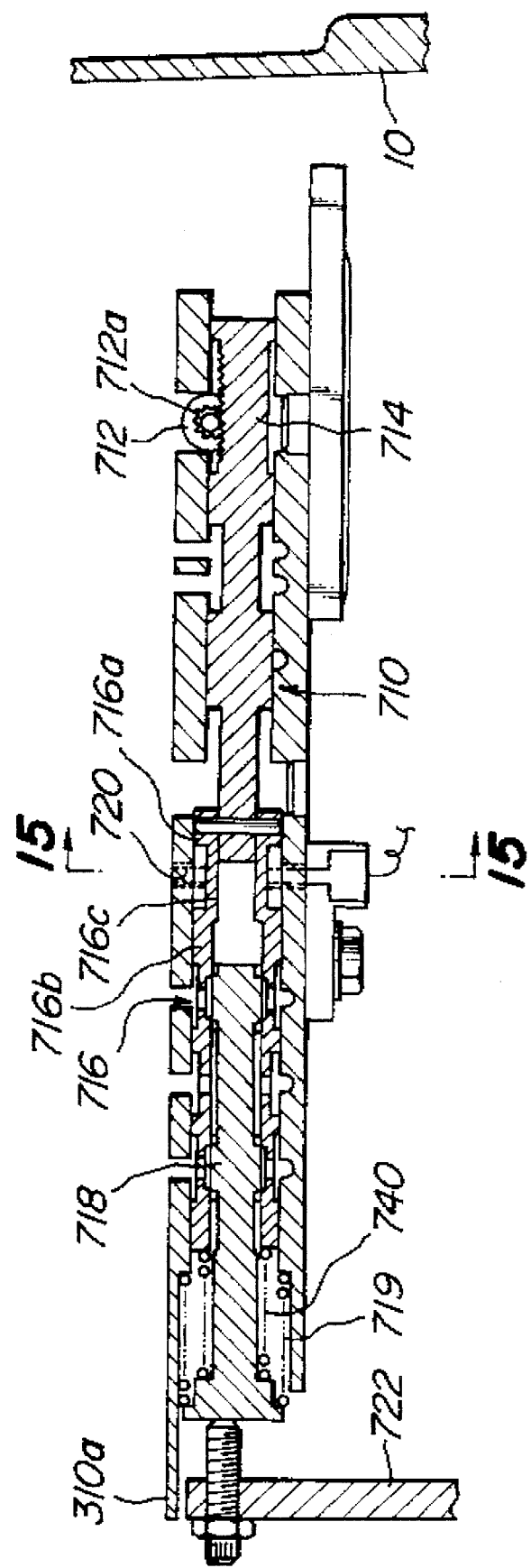
FIG_13

FIG_14
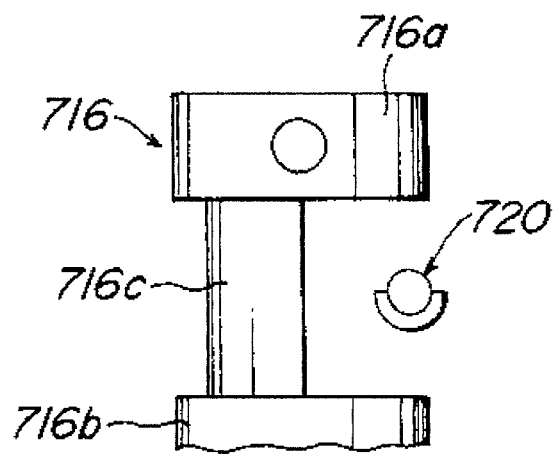
FIG_15
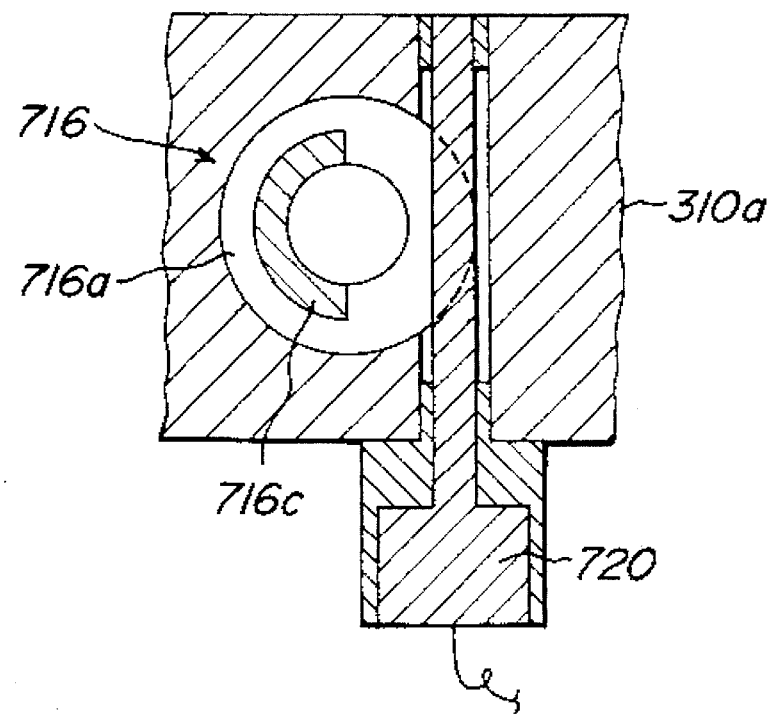

FIG_16
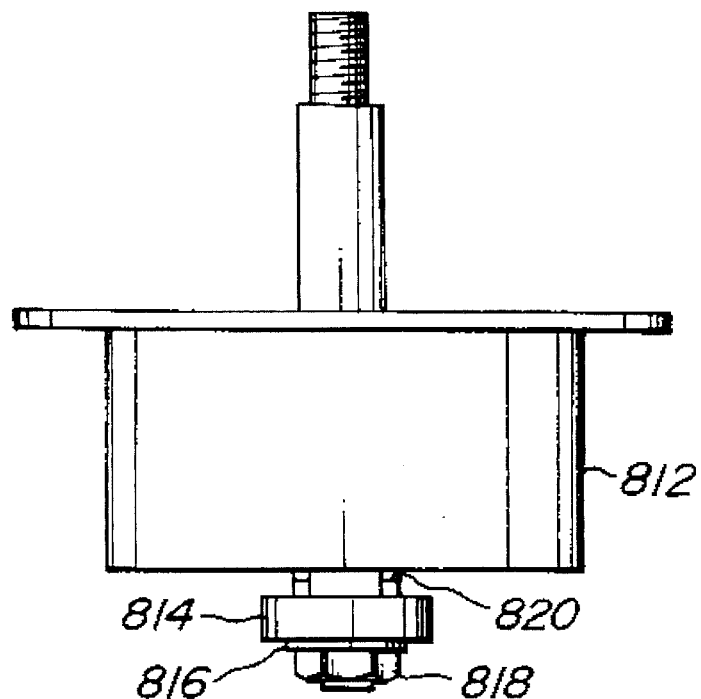
FIG_17
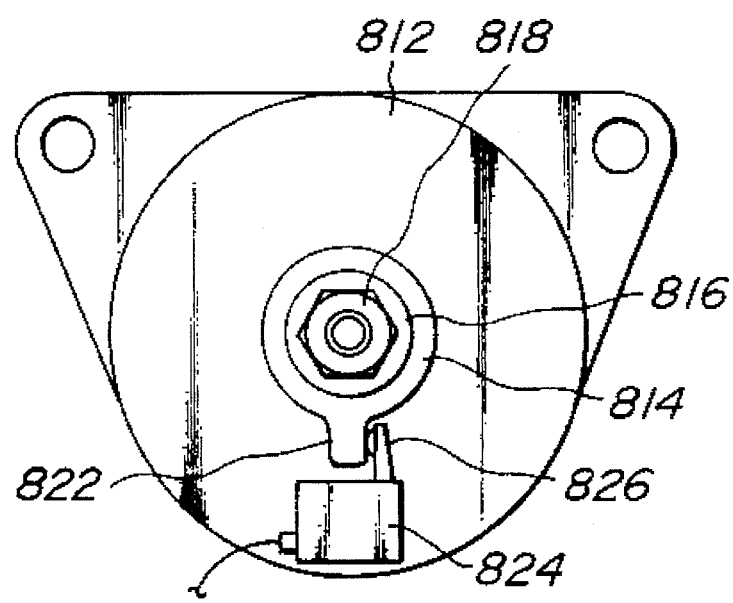

FRICTION-ROLLER-TYPE CONTINUOUSLY VARIABLE TRANSMISSION

BACKGROUND OF THE INVENTION

1. Field of the Invention

The present invention relates generally to a friction-roller-type continuously variable transmission for automobiles or the like, and more particularly to a speed ratio control device of such transmission.

2. Description of the Related Art

A typical example of the friction-roller-type continuously variable transmission is known, e.g., from JP-A-4-29659. The transmission as known from this publication comprises friction rollers which are arranged in a toroidal groove formed between input and output disks and rotatably supported by rotatable and axially movable roller support members having respective rotational axes which are perpendicular to the common axis of the input and output disks. The speed ratio of the transmission between the input and output disks is determined in accordance with the axial position of the friction rollers. Thus, hydraulic cylinder units are provided to axially move the roller support members and hence friction rollers relative to the input and output disks. For controlling the speed ratio of the transmission, there is provided a speed ratio control device including a step motor which is actuated in accordance with an instructed speed ratio. A lock-up inhibitor valve has a valve spool which is movable in the axial direction as the step motor is actuated. A speed ratio control valve has a valve spool which is provided within a valve sleeve. The control valve sleeve has one end which is connected to one end of the lock-up inhibitor valve spool so that the control valve sleeve is movable in the axial direction together with the lock-up inhibitor valve spool. The other end of the lock-up inhibitor valve spool is provided with a low switch, while the other end of the control valve sleeve can be displaced into contact with a stopper. In this instance, the control valve sleeve is connected to the lock-up inhibitor valve spool via a spring so that the lock-up inhibitor valve spool is capable of performing a stroke motion relative to the control valve sleeve. The low switch is located at a particular position of the lock-up inhibitor valve spool which has not performed a stroke motion relative to the control valve sleeve which, in turn, has displaced into contact with the stopper so as to achieve the lowest speed ratio. The low switch is adjusted so that it is operated at such a particular position of the lock-up inhibitor valve spool.

The above-mentioned continuously variable transmission proved to achieve a satisfactory control of the speed ratio. However, there may be instances wherein it would be desirable to provide the same function with a further simplified construction. For example, the known transmission requires an adjustment of the stopper so that the lowest speed ratio is achieved when the control sleeve is displaced into contact with the stopper, and an adjustment of the low switch so that it is operated at the particular position of the lock-up inhibitor valve spool. Thus, depending upon arrangement of the stopper and the low switch, the adjustments at the two positions may be troublesome and time consuming. Also, it may be difficult to completely accommodate the low switch within the transmission casing. When the low switch partly protrudes from the transmission casing, it may interfere with adjacent components and the position of the low switch may be dislocated in normal use condition of the transmission.

SUMMARY OF THE INVENTION

It is therefore an object of the present invention to provide a friction-roller type continuously variable transmission including an improved speed ratio control device which has a simplified construction, and is easy to adjust the low switch and highly reliable in operation.

According to one aspect of the present invention, there is provided a friction roller type continuously variable transmission comprising:

A) an input disk and an output disk both having a common axis and contact surfaces which are opposed to each other to define a toroidal groove therebetween;

B) a plurality of friction rollers arranged in said toroidal groove and maintained in frictional contact with said contact surfaces of the input and output disks;

C) a plurality of roller support members for rotatably supporting the friction rollers through eccentric shafts, respectively, said roller support members each having a shaft portion with an axis which is perpendicular to said common axis of the input and output disks, said roller support members being rotatable about the axis of the shaft portions and axially movable along the shaft portions;

D) a hydraulic cylinder device for driving the roller support members in the axial directions of said shaft portions; and E) a speed ratio control device including a speed ratio control valve for controlling a hydraulic pressure to be supplied to said hydraulic cylinder device, wherein said speed ratio control valve comprises:

(i) a valve sleeve and a valve spool relatively slidably fitted within said sleeve;

(ii) a step motor having an angular position which is determined in accordance with a speed ratio as instructed by said speed ratio control device, said step motor being adapted to drive one of said valve sleeve and said valve spool in a predetermined axial direction; and (iii) a low switch for stopping said one of the valve sleeve and the valve spool and effecting a changeover between different positions of the switch when said one of the valve sleeve and the valve spool has reached a position where the speed ratio becomes the lowest.

In this instance, either the valve sleeve or the valve spool of the speed ratio control valve which is driven by the step motor may be connected to the step motor through a driving member which, in turn, is driven in the axial direction by the step motor.

According to another aspect of the present invention, there is provided a friction roller type continuously variable transmission comprising:

A) an input disk and an output disk both having a common axis and contact surfaces which are opposed to each other to define a toroidal groove therebetween;

B) a plurality of friction rollers arranged in said toroidal groove and maintained in frictional contact with said contact surfaces of the input and output disks;

C) a plurality of roller support members for rotatably supporting the friction rollers through eccentric shafts, respectively, said roller support members each having a shaft portion with an axis which is perpendicular to said common axis of the input and output disks, said roller support members being rotatable about the axis of the shaft portions and axially movable along the shaft portions;

D) a hydraulic cylinder device for driving the roller support members in the axial directions of said shaft portions; and E) a speed ratio control device including a speed ratio control valve for controlling a hydraulic pressure to be supplied to said hydraulic cylinder device, wherein said speed ratio control valve comprises:

(i) a step motor having an angular position which is determined in accordance with a speed ratio as instructed by said speed ratio control device, said step motor having an output shaft which is provided with a catch; and (ii) a low switch for effecting a changeover between different positions of the switch when engaged by said catch for stopping the step motor.

In this instance, the output shaft of the step motor may be provided with a plate which is rotatable jointly with the output shaft, and the plate may have an outer peripheral portion which is at least partly formed as the catch.

Operation and function advantageously achieved by the continuously variable transmission according to the present invention are as follows. It is assumed for the sake of convenience that the valve sleeve of the speed ratio control valve is driven by the step motor and connected thereto through a driving member which is driven in the axial direction by the step motor. When the speed ratio of the transmission is changed to a lower side, the step motor causes the driving member to displace in a predetermined direction thereby to displace the valve sleeve. The speed ratio becomes the lowest when the valve sleeve reaches the position where it is brought into contact with the low switch which is thereby operated. Therefore, when the valve sleeve reaches the position corresponding to the lowest speed ratio, it contacts with the low switch and is thereby restricted from further displacement while simultaneously operating the low switch. Furthermore, when the speed ratio of the transmission is changed to a higher side, the step motor causes the driving member to displace in a direction opposite to the above-mentioned predetermined direction, thereby to displace the valve sleeve. Since the valve sleeve is disengaged from the low switch, the operation of the low switch is stopped. It is thus unnecessary to perform an adjustment of the low switch. The low switch can be provided at the position where the valve sleeve is provided, and can be completely accommodated within the transmission casing without protruding therefrom, or without interfering with adjacent components. The position of the low switch can be stably maintained, without being shifted during the use condition of the transmission.

It should be noted that similar function can be achieved when the low switch is operated by the valve spool or when it is operated directly by the step motor.

BRIEF DESCRIPTION OF THE DRAWINGS

The present invention will now be explained in further detail by referring to some preferred embodiments shown in the accompanying drawings, in which:

FIG. 1 is a fragmentary longitudinal-sectional view showing the continuously variable transmission according to a first embodiment of the present invention;

FIG. 2 is a cross-sectional view taken along the line 2—2 in FIG. 1;

FIG. 3 is a longitudinal-sectional view showing the main valve body and associated components in FIG. 2;

FIG. 4 is a schematic view showing the relationship between the speed ratio control valve sleeve and the low switch in the first embodiment;

FIG. 5 a cross-sectional view taken along the line 5—5 in FIG. 3;

FIG. 6 is a longitudinal-sectional view similar to FIG. 3 and showing the main valve body and associated components according to a second embodiment of the present invention;

FIG. 13 is a longitudinal-sectional view similar to FIGS. 3, 6 and 9 and showing the main valve body and associated components according to a fourth embodiment of the present invention;

FIG. 14 schematic view showing the relationship between the speed ratio control valve sleeve and the low switch in the fourth embodiment;

FIG. 15 is a cross-sectional view taken along the line 15—15 in FIG. 13;

FIG. 16 is a side view showing the step motor according to a fifth embodiment of the present invention; and FIG. 17 is a front view of the step motor shown in FIG. 16.

DESCRIPTION OF THE PREFERRED EMBODIMENTS

Figure 7:
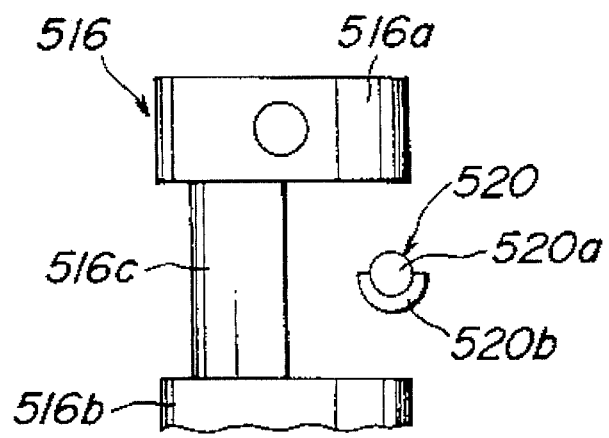
FIG. 7 is a schematic view showing the relationship between the speed ratio control valve spool and the low switch in the second embodiment.

Referring now to FIGS. 1 and 2, there is shown a first embodiment of the friction roller type continuously variable transmission according to the present invention, which includes a transmission casing 10, and a first speed ratio control mechanism 22 and a second speed ratio control mechanism 24 both provided in the casing 10.

The first speed ratio control mechanism 22 has an input disk 26, an output disk 28 and a pair of friction rollers 30 for transmitting torque between the two disks. The input disk 26 and the output disk 28 have contact surfaces which are formed into toroidal surfaces and engaged by the friction rollers 30. By changing the contact states of the friction rollers 30 relative to the input disk 26 and the output disk 28, it is possible to continuously change the rotational speed ratio between the input disk 26 and the output disk 28. The second speed ratio control mechanism 24 also has an input disk 32, an output disk 34 and a pair of friction rollers 36, which are constituted in the same manner as the first speed speed ratio control mechanism 22. However, the arrangement of the input disk 32 and the output disk 34 of the second speed ratio control mechanism 24 is opposite to that of the first speed ratio control mechanism 22. Thus, the arrangement is such that the output disk 28 of the first speed ratio control mechanism 22 and the output disk 34 of the second speed ratio control mechanism 24 are arranged adjacent to each other.

The input disk 26 of the first speed ratio control mechanism 22 is supported on the outer periphery of an input shaft 38 through a ball spline. A cam flange 42 is arranged at a back surface side of the input disk 26, i.e., that side of the input disk 26 which is remote from the output disk 28. A cam roller 46 is provided between opposite cam surfaces of the cam flange 42 and the input disk 26. The cam flange 42 is connected to a forward-drive/reverse-drive switching mechanism and a torque converter, which are not shown, and supplied with engine torque therethrough. The cam roller 46 is formed into such a shape that it generates a force which urges the input disks 26 and 32 toward the respective output disks 28 and 34 upon occurrence of a relative rotation between the input disk 26 and the cam flange 42. The input disk 32 of the second speed ratio control mechanism 24, too, is connected to the input shaft 38 through a ball spline. The input disks 26 and 32 are applied with an axial force by a dish plate 51 which is compressed by a loading nut 50 threadedly connected to the input shaft 38, and are thereby urged toward the output disks 28 and 34, respectively. The output disk 28 of the first speed ratio control mechanism 22 and the output disk 34 of the second speed ratio control mechanism 24 are rotatably supported on the input shaft 38 through needle bearings, respectively.

There is provided a driving gear 55 which is rotatable jointly with the output disks 28 and 34. The driving gear 55 is meshed with a driven gear 60 which is connected by a spline to one end of an intermediate shaft 59 extending in parallel with the input shaft 38, such that the driven gear 60 is rotatable jointly with the intermediate shaft 59. A gear 61 is integrally formed on the other end of the intermediate shaft 59. The gear 61 is connected, through an idler gear, not shown, to a gear 63 which is formed integrally with an output shaft 62.

FIG. 2 is a sectional view showing part of the first speed ratio control mechanism 22. It should be noted in this connection that, although the representation has been omitted for the sake of simplicity, the second speed ratio control mechanism 24 has a basic constitution which is essentially same as that of the first speed ratio control mechanism 22 shown in FIG. 2.

The first speed ratio control mechanism 22 includes roller support members 83 in the form of trunnions which are supported at upper and lower shaft portions 83a and 83b by spherical bearings 110 and 112. These bearings 110 and 112 permit the roller support members 83 to undergo rotation and/or axial movement. The above-mentioned friction roller 30 is rotatably supported by the roller support member 83 through an eccentric shaft 84. The spherical bearing 110 is supported by a link 114 which is supported by a link post 116 which, in turn, is secured to the casing 10. Similarly, the spherical bearing 112 is supported by a link 118 which is supported by a link post 120. Each roller support member 83 has an extension 83c which is provided coaxially with the shaft portion 83b. The extension 83c is rotatable jointly with the shaft portion 83b.

Each extension 83c is provided on its outer periphery with a piston 124 which is received within a piston bore 304 formed in a main cylinder body 302a secured to the casing 10 by bolts 300. A subsidiary cylinder member 302b is secured to the lower surface of the main cylinder member 302a by the bolts 300, with a spacer plate 306 therebetween. A consolidated cylinder body 302 is constituted by the main cylinder member 302a and the subsidiary cylinder member 302b. Pressure chambers 128 and 130 are formed on the opposite sides of the piston 124, so that the piston 124 can be axially moved by a hydraulic pressure acting thereon. It should be noted in this connection that the pressure chambers 128 and 130 are arranged upside-down with respect to the right side and the left side in FIG. 2. A hydraulic cylinder unit is constituted by the piston 124 and the consolidated cylinder body 302 comprised of the piston bore 304 in the main cylinder body 302a. As further shown in FIG. 3, a consolidated valve body is constituted by the main valve body 310a and a subsidiary valve body 310b secured to the top surface of the main valve body 310a.

As shown in FIG. 3, the main valve body 310a is provided with a speed ratio control valve 410. The speed ratio control valve 410 includes a step motor 412 which is operated in accordance with an instructed speed ratio. A valve spool 414 of a lock-up inhibitor valve is provided with a rack which is meshed with a pinion 412a driven by the step motor 412. Thus, the lock-up inhibitor valve spool 414 can be moved in the axial direction as the step motor 412 is operated. The speed ratio control valve 410 further includes a control valve sleeve 416 having one end which is connected to the lock-up inhibitor valve spool 414 through an yield mechanism which may comprise a pin 490 and an elongate hole 492. Thus, the speed ratio control valve sleeve 416 is axially movable relative to the lock-up inhibitor valve spool 414, and can be moved in the axial direction together with the lock-up inhibitor valve spool 414 when the step motor 412 is operated. A spring 415 is arranged between the speed ratio control valve sleeve 416 and the lock-up inhibitor valve spool 414. A speed ratio control valve spool 418 is provided within the valve sleeve 416, and urged by a spring 419 toward left in FIG. 3. A spring 440 is arranged between the valve sleeve 416 and the valve spool 418 of the speed ratio control valve 410, and urges them in directions away from each other. A low switch 420 is provided, which extends through the main valve body 310a in the vicinity of the end portion of the speed ratio control valve sleeve 416 where the lock-up inhibitor valve spool 414 is connected.

The lower end of each extension 83c is provided with a cam, not shown, which is rotatable jointly with the extension 83c. The cam has an inclined cam surface which is contacted by a link 322. The arrangement is such that the rotation of the cam causes the link 322 to undergo a swinging motion so that the forward end of the link 322 is brought into a pressure contact with the speed ratio control valve spool 418.

FIG. 4 shows the relationship between the low switch 420 and the speed ratio control valve sleeve 416, and FIG. 5 shows the cross-section taken along the line 5—5 in FIG. 3. As particularly shown in FIG. 4, the low switch 420 has a rod-like portion which is constituted by a columnar electric conductor 420a and an insulator 420b for covering one half of the outer periphery of the conductor 420a. The valve sleeve 416 has a pair of large diameter portions 416a and 416b which are spaced from each other by a predetermined distance, and a small diameter portion 416c having a semi-circular cross-section which is arranged between the large diameter portions 416a and 416b. The rod-like portion of the low switch 420 is situated opposite to the small diameter portion 416c such that it can be brought into contact with the large diameter portion 416a at that side where the electric conductor 420a is exposed, and with the large diameter portion 416b at the side of the insulator 420b. As further shown in FIG. 5, the upper and lower end portions of the low switch 420 are fixedly connected to the main valve body 310a by bolts, not shown.

The operation of the friction-roller type continuously variable transmission as a whole is generally same as that described in the aforementioned JP-A-4-29659, so that the disclosure of this patent document is herein incorporated by reference. The following explanation is therefore focused on the operation of the speed ratio control device in accordance with the above-mentioned first embodiment.

When the speed ratio is changed to a lower side, the lock-up inhibitor valve spool 414 is displaced by the step motor 412 toward left in FIG. 3, so that the speed ratio control valve sleeve 416 is also displaced toward left in FIG. 3. The speed ratio becomes the lowest when the large diameter portion 416a of the speed ratio control valve sleeve 416 reaches a position where it achieves a contact with the low switch 420. On this occasion, due to the contact of the large diameter portion 416a with the electric conductor 420a of the low switch 420, an electric current is conducted between the speed ratio control valve sleeve 416 and the low switch 420, to thereby operate the low switch 420. That is to say, the speed ratio control valve sleeve 416 in contact with the low switch 420 is prevented from further displacement when it has reached the position where the speed ratio becomes the lowest and where the low switch 420 is operated. Incidentally, even when the speed ratio control sleeve 416 has been stopped, the lock-up inhibitor valve spool 414 is capable of moving an amount which corresponds to the length of the elongate hole 492, by compressing the spring 415.

Conversely, when the speed ratio is changed to a higher side, the lock-up inhibitor valve spool 414 is displaced by the step motor 412 toward right in FIG. 3, so that the speed ratio control valve sleeve 416 is also displaced toward right in FIG. 3. On this occasion, the large diameter portion 416a is disengaged from the low switch 420, so that the supply of electric current to the low switch 420 is shut off to cancel the operation of the low switch 420. The speed ratio control valve sleeve 416 can be displaced to the position where the large diameter portion 416b is brought into contact with the low switch 420. Even when the large diameter portion 416b of the speed ratio control valve sleeve 416 is brought into contact with the low switch 420, the insulator 420b of the low switch 420 opposite to the large diameter portion 416b serves to prevent the low switch 420 from being operated.

A second embodiment of the speed ratio control device in the continuously variable transmission according to the present invention will be explained below with reference to FIGS. 6 to 8. The second embodiment is basically same as the above-mentioned first embodiment but differs therefrom in that the relationship between the valve sleeve and the valve spool of the speed ratio control valve is reversed.

The speed ratio control valve is denoted as a whole by reference numeral 510, and has a step motor 512 which is operated in accordance with an instructed speed ratio. A valve spool 514 of a lock-up inhibitor valve is provided with a rack which is meshed with a pinion 512a driven by the step motor 512. Thus, the lock-up inhibitor valve spool 514 can be moved in the axial direction as the step motor 512 is operated. The speed ratio control valve 510 further includes a control valve spool 516 having one end which is connected to the lock-up inhibitor valve spool 514 through an yield mechanism which may comprise a pin 590 and an elongate hole 592. Thus, the speed ratio control valve spool 516 is axially movable relative to the lock-up inhibitor valve spool 514, and can be moved in the axial direction together with the lock-up inhibitor valve spool 514 when the step motor 512 is operated. A spring 515 is arranged between the speed ratio control valve spool 516 and the lock-up inhibitor valve spool 514. The speed ratio control valve spool 516 is provided within a valve sleeve 518 which is urged by a spring 519 toward left in FIG. 6. A retainer 530 is fitted into the outer periphery of the speed ratio control valve sleeve 518, and a spring 532 is arranged between the valve spool 516 and the retainer 530 for urging them in directions away from each other. A low switch 520 is provided, which extends through the main valve body 310a in the vicinity of the end portion where the speed ratio control valve spool 516 is connected to the lock-up inhibitor valve spool 514.

Figure 8:
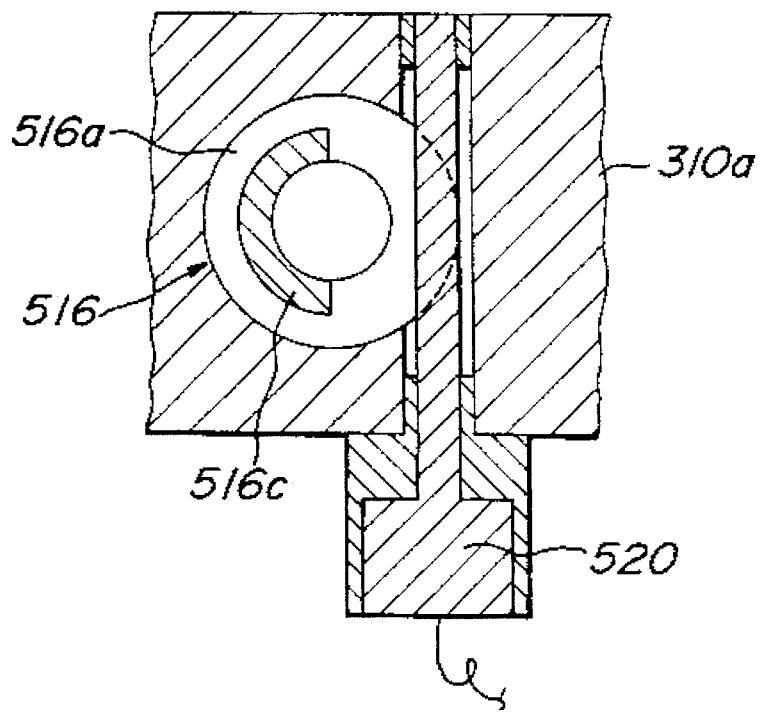
FIG. 8 is a cross-sectional view taken along the line 8—8 in FIG. 6.

As particularly shown in FIG. 7, the low switch 520 has a rod-like portion which is constituted by a columnar electric conductor 520a and an insulator 520b for covering one half of the outer periphery of the conductor 520a. The valve spool 516 has a pair of large diameter portions 516a and 516b which are spaced from each other by a predetermined distance, and a small diameter portion 516c having a semi-circular cross-section which is arranged between the large diameter portions 516a and 516b. The rod-like portion of the low switch 520 is situated opposite to the small diameter portion 516c such that it can be brought into contact with the large diameter portion 516a at that side where the electric conductor 520a is exposed, and with the large diameter portion 516b at the side of the insulator 520b. As further shown in FIG. 8, the upper and lower end portions of the low switch 520 are fixedly connected to the main valve body 310a by bolts, not shown.

As in the first embodiment, the lower end of each extension 83c is provided with a cam and a link 522, such that the rotation of the cam causes the link 522 to undergo a swinging motion so that the forward end of the link 522 is brought into a pressure contact with the retainer 530.

The operation of the speed ratio control device according to the second embodiment will be explained below. When the speed ratio is changed to a lower side, the lock-up inhibitor valve spool 514 is displaced by the step motor 512 toward left in FIG. 6, so that the speed ratio control valve spool 516 is also displaced toward left in FIG. 6. The speed ratio becomes the lowest when the large diameter portion 516a of the speed ratio control valve spool 516 reaches a position where it achieves a contact with the low switch 520. On this occasion, due to the contact of the large diameter portion 516a with the electric conductor 520a of the low switch 520, an electric current is conducted between the speed ratio control valve spool 516 and the low switch 520, to thereby operate the low switch 520. That is to say, the speed ratio control valve sleeve 516 in contact with the low switch 520 is prevented from further displacement when it has reached the position where the speed ratio becomes the lowest and where the low switch 520 is operated. Incidentally, even when the speed ratio control spool 516 has been stopped, the lock-up inhibitor valve spool 514 is capable of moving an amount which corresponds to the length of the elongate hole 592, by compressing the spring 515.

Conversely, when the speed ratio is changed to a higher side, the lock-up inhibitor valve spool 514 is displaced by the step motor 512 toward right in FIG. 3, so that the speed ratio control valve spool 516 is also displaced toward right in FIG. 3. On this occasion, the large diameter portion 516a is disengaged from the low switch 520, so that the supply of electric current to the low switch 520 is shut off to cancel the operation of the low switch 520. The speed ratio control valve spool 516 can be displaced to the position where the large diameter portion 516b is brought into contact with the low switch 520. Even when the large diameter portion 516b of the speed ratio control valve spool 516 is brought into contact with the low switch 520, the insulator 520b of the low switch 520 opposite to the large diameter portion 516b serves to prevent the low switch 520 from being operated.

Figure 9:
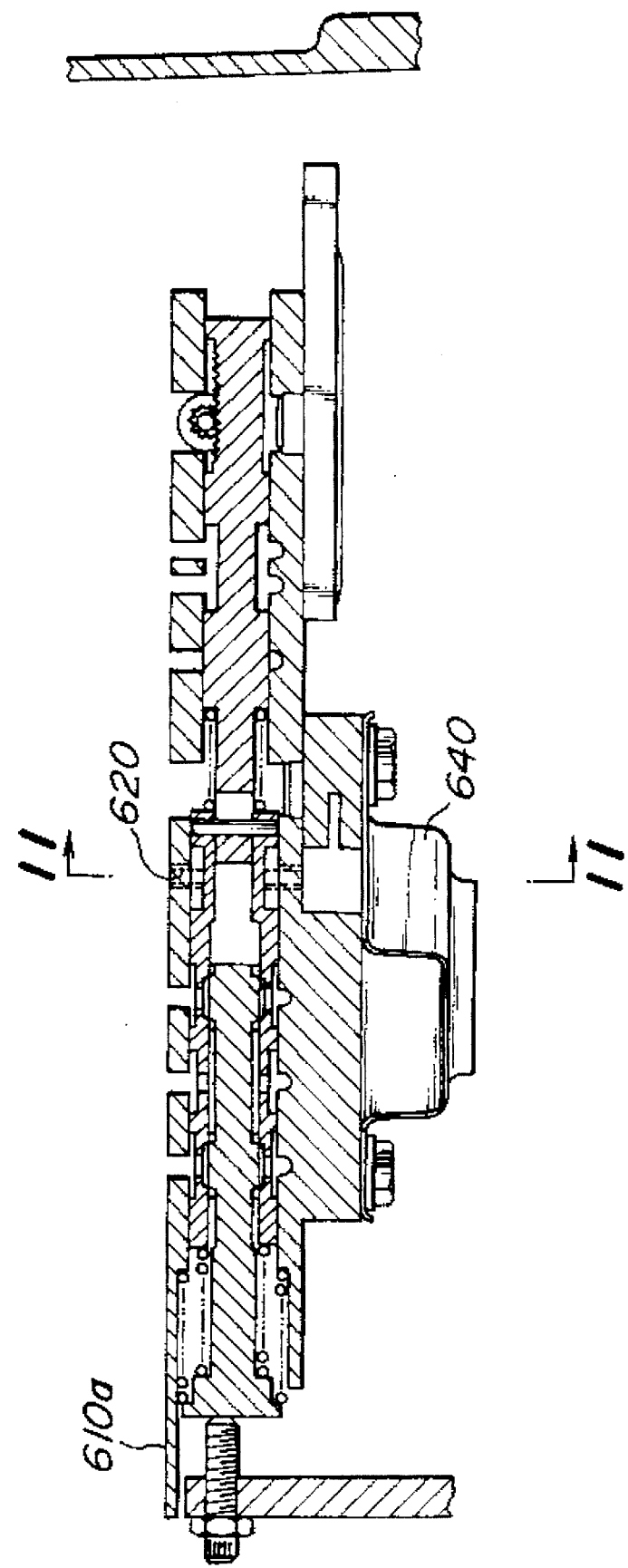
FIG. 9 is a longitudinal-sectional view similar to FIGS. 3 and 6 and showing the main valve body and associated components according to a third embodiment of the present invention.
Figure 10:
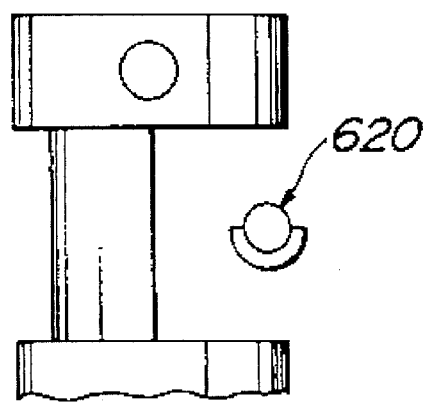
FIG. 10 is a schematic view showing the relationship between the speed ratio control valve sleeve and the low switch in the third embodiment.
Figure 11:
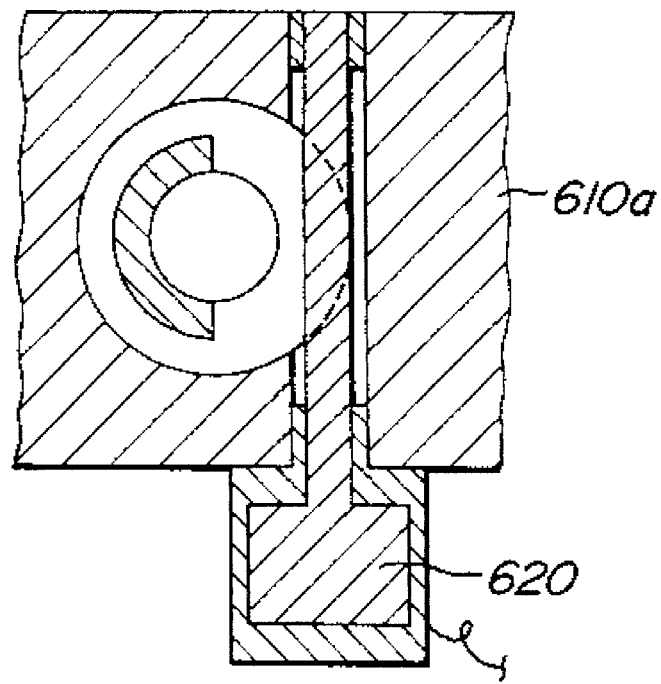
FIG. 11 is a cross-sectional view taken along the line 11—11 in FIG. 9.
Figure 12:
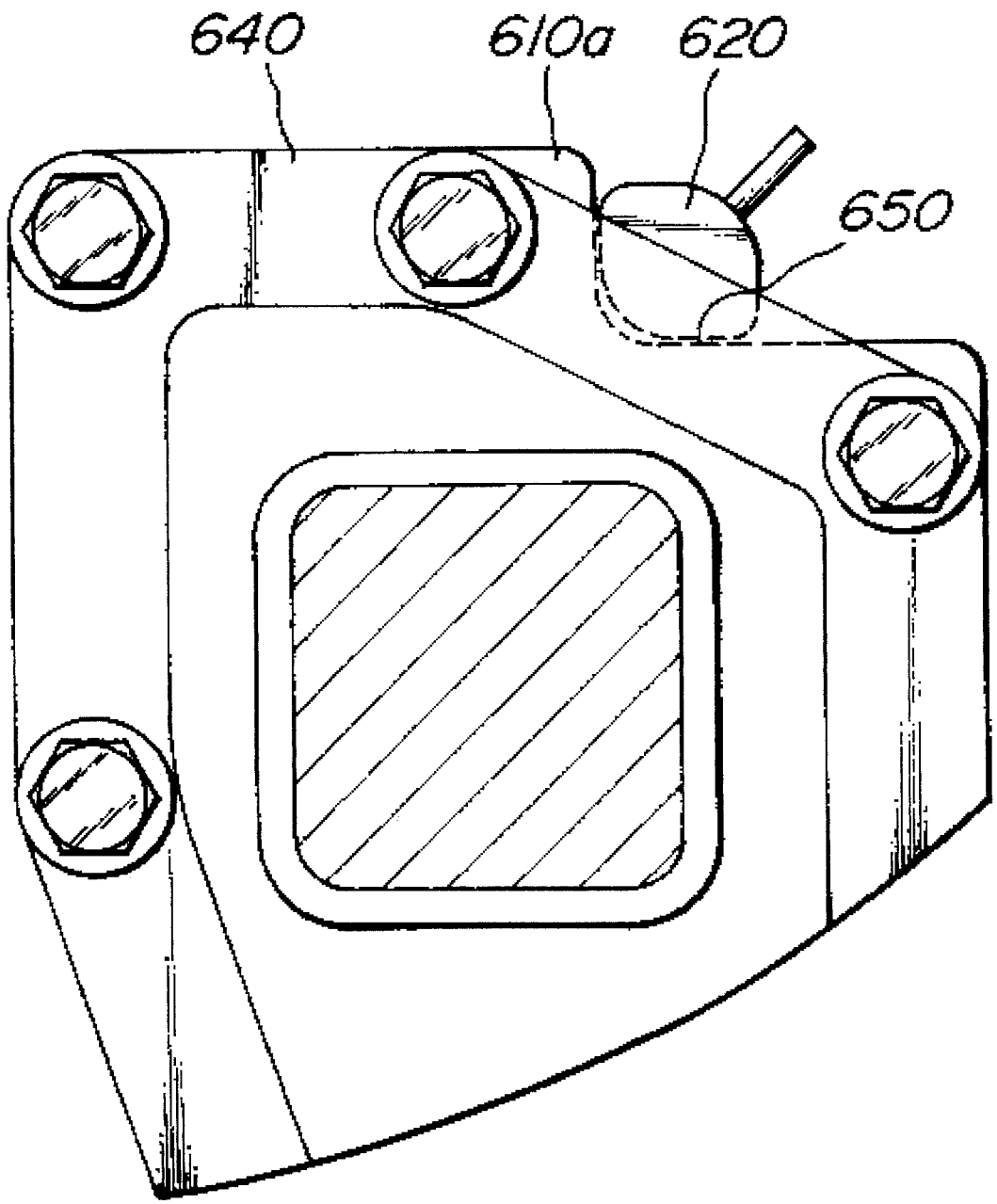
FIG. 12 is a side view of the low switch as seen from the oil strainer side.

A third embodiment of the speed ratio control device in the continuously variable transmission according to the present invention will be explained below with reference to FIGS. 9 to 11. The third embodiment is basically same as the above-mentioned first embodiment in the constitution of the speed ratio control device 610, but differs therefrom in the manner of securing the low switch 620 to the main valve body 610a. That is to say, the low switch 620 has a lower end shown in FIG. 9, which can be brought into contact with an oil strainer 640 as shown in FIG. 12, so as to limit the downward movement of the low switch 620. As particularly shown in FIG. 12, the main valve body 610a is formed with a rotation stopper 650 having a shape which conforms to the adjacent two surfaces of the low switch 620. The low switch 620 is arranged with the above-mentioned two surfaces in contact with the rotation stopper 650, so as to restrict the rotation of the low switch 620. By this, the low switch 620 is fixedly secured to the main valve body 610a. The operation of the third embodiment is essentially same as that of the first embodiment.

A fourth embodiment of the speed ratio control device in the continuously variable transmission according to the present invention will be explained below with reference to FIGS. 13 to 15. The fourth embodiment is featured by an integral connection of the lock-up inhibitor valve spool and the speed ratio control valve sleeve.

The speed ratio control valve is denoted as a whole by reference numeral 710, and has a step motor 712 which is operated in accordance with an instructed speed ratio. A valve spool 714 of a lock-up inhibitor valve is provided with a rack which is meshed with a pinion 712a driven by the step motor 712. Thus, the lock-up inhibitor valve spool 714 can be moved in the axial direction as the step motor 712 is operated. The speed ratio control valve 710 further includes a control valve sleeve 716 having one end which is connected to the lock-up inhibitor valve spool 714. Thus, the speed ratio control valve sleeve 716 can be moved in the axial direction together with the lock-up inhibitor valve spool 714 when the step motor 712 is operated. A speed ratio control valve spool 718 is arranged within the valve sleeve 716, and urged by a spring 719 toward left in FIG. 13. A spring 740 is arranged between the valve sleeve 716 and the valve spool 718 for urging them in directions away from each other. A low switch 720 is provided, which extends through the main valve body 310a in the vicinity of the end portion where the speed ratio control valve sleeve 716 is connected to the lock-up inhibitor valve spool 714. The low switch 720 has a shape which is similar to that of the first embodiment, and is secured to the main valve body 310a such that it is opposed to the small diameter portion 716c of the speed ratio control valve sleeve 716 between the large diameter portions 716a and 716b, in essentially same manner as the first embodiment. The lower end of each extension 83c is provided with a cam (not shown) and a link 722, in the same manner as the first embodiment. Thus, the arrangement is such that the rotation of the cam causes the link 722 to undergo a swinging motion so that the forward end of the link is brought into contact with the speed ratio control valve spool 718. The function achieved by the fourth embodiment is basically same as that of the first embodiment.

A fifth embodiment of the speed ratio control device in the continuously variable transmission according to the present invention will be explained below with reference to FIG. 16. In this embodiment, a step motor 812 has an output shaft which is provided with a plate 814. The plate 814 is fixedly secured to the output shaft of the step motor 812 by a nut 818 and a washer 816, with an insulator 820 arranged between the plate 814 and the step motor 812. The plate 814 may be in the form of a disk having an outer periphery provided with a protrusion 822 which projects radially outwardly. A low switch 824 is also secured to the step motor 812. The low switch 824 has an actuator tab 826 which protrudes from the low switch 824. The actuator tab 826 can be brought into contact with the protrusion 822 of the plate 814. The low switch 824 is operated when the protrusion 822 of the plate 814 is brought into contact with the actuator tab 826 of the low switch 824. The step motor 812 is stopped when the protrusion 822 is brought into contact with the actuator tab 826 of the low switch 824 and the speed ratio control valve has assumed the lowest speed ratio state. This embodiment also achieves essentially same function as that of the above-mentioned embodiments.

It will be appreciated from the foregoing description that, in accordance with the present invention, when the speed ratio assumes the lowest state, either the valve sleeve or the valve spool of the speed ratio control valve is brought into contact with the low switch to thereby operate the low switch, thereby rendering it unnecessary to specifically adjust the low switch. The low switch is not dislocated in normal use condition of the transmission. Moreover, the low switch is arranged at the location where the valve sleeve or the valve spool of the speed ratio control valve is provided. Therefore, it is possible to completely accommodate the low switch within the transmission casing, and to thereby avoid protrusion of the low switch from the casing or interference with other components. The same is true in the case of arrangement wherein the low switch is attached to the step motor and operated when the speed ratio assumes the lowest state, by the protrusion of the plate fixedly secured to the output shaft of the step motor.

We claim:

1. A friction roller type continuously variable transmission comprising:

(A) an input disk and an output disk both having a common axis and contact surfaces which are opposed to each other to define a toroidal groove therebetween;

(B) a plurality of friction rollers arranged in said toroidal groove and maintained in frictional contact with said contact surfaces of the input and output disks;

(C) a plurality of roller support members for rotatably supporting the friction rollers through eccentric shafts, respectively, said roller support members each having a shaft portion with an axis which is perpendicular to said common axis of the input and output disks, said roller support members being rotatable about the axis of the shaft portions and axially movable along the shaft portions;

(D) a hydraulic cylinder device for driving the roller support members in the axial directions of said shaft portions; and (E) a speed ratio control device including a speed ratio control valve for controlling a hydraulic pressure to be supplied to said hydraulic cylinder device; wherein said speed ratio control valve comprises:

(i) a valve sleeve and a valve spool relatively slidably fitted within said sleeve;

(ii) a step motor having an angular position which is determined in accordance with a speed ratio as instructed by said speed ratio control device, said step motor being adapted to drive one of said valve sleeve and said valve spool in a predetermined axial direction; and (iii) a low switch formed integrally with a stopper for stopping the said one of the valve sleeve and the valve spool when it has reached a position where the speed ratio becomes the lowest, said low switch being operated as said one of the valve sleeve and the valve spool is brought into contact with the low switch effecting a changeover between different positions of the low switch.

2. The continuously variable transmission according to claim 1, wherein said one of the valve sleeve and the valve spool driven by said step motor is said valve sleeve.

3. The continuously variable transmission according to claim 2, wherein said valve sleeve is connected to said step motor through a driving member which is driven in said axial direction by the step motor.

4. The continuously variable transmission according to claim 1, wherein said one of the valve sleeve and the valve spool driven by said step motor is said valve spool.

5. The continuously variable transmission according to claim 4, wherein said valve spool is connected to said step motor through a driving member which is driven in said axial direction by the step motor.

* * * * *